(12) United States Patent
Sremac et al.

(10) Patent No.: US 7,349,790 B2
(45) Date of Patent: Mar. 25, 2008

(54) METHOD FOR OPERATING A FLEX FUEL CONVERSION SYSTEM

(76) Inventors: Milan J. Sremac, 5820 N. Northwest Hwy., Chicago, IL (US) 60631; John D. Meaney, 4352 Fenton Rd., Hartland, MI (US) 48353

( * ) Notice: Subject to any disclaimer, the term of this patent is extended or adjusted under 35 U.S.C. 154(b) by 0 days.

(21) Appl. No.: 11/828,331

(22) Filed: Jul. 25, 2007

(65) Prior Publication Data

US 2008/0022986 A1  Jan. 31, 2008

Related U.S. Application Data

(60) Provisional application No. 60/834,251, filed on Jul. 28, 2006.

(51) Int. Cl.
*F02D 41/00* (2006.01)

(52) U.S. Cl. ........................... 701/104; 123/478

(58) Field of Classification Search ................. 701/104, 701/103, 105, 102, 115; 123/478, 480, 674
See application file for complete search history.

(56) References Cited

U.S. PATENT DOCUMENTS

| 4,635,608 | A |   | 1/1987  | Carroll |         |
|-----------|---|---|---------|---------|---------|
| 4,711,223 | A |   | 12/1987 | Carroll |         |
| 5,325,836 | A | * | 7/1994  | Orzel et al. | 123/478 |
| 5,343,848 | A |   | 9/1994  | Birch et al. |       |
| 5,467,755 | A | * | 11/1995 | Konrad et al. | 123/674 |
| 5,709,196 | A |   | 1/1998  | Coleman et al. |     |
| 5,941,217 | A | * | 8/1999  | Cheng et al. | 123/494 |
| 5,970,968 | A | * | 10/1999 | Davis | 123/694 |
| 6,321,593 | B1 |  | 11/2001 | Rich |          |
| 6,397,583 | B1 |  | 6/2002  | Davey et al. |   |
| 6,502,533 | B1 |  | 1/2003  | Meacham |       |

(Continued)

FOREIGN PATENT DOCUMENTS

DE       0 335 168 A2 * 10/1989

(Continued)

OTHER PUBLICATIONS

Siemens Vdo, Flex Fuel Sensor Data Sheet, <available at http://usa.siemensvdo.com/products_solutions/powertrain/sensors/powertrain/flex-fuel-sens . . . >.

*Primary Examiner*—Hieu T. Vo

(57) ABSTRACT

A method for operating a flex fuel conversion system for efficiently providing an aftermarket fuel delivery system which allows a vehicle to be operated on gasoline, ethanol or any combination of gasoline and ethanol. The a method for operating a flex fuel conversion system generally includes providing a fuel sensor to measure a current alcohol level of fuel within a fuel stream of an engine; providing a microprocessor, wherein a first signal including the current alcohol level of the fuel is sent to the microprocessor from the fuel sensor and the current alcohol level is subsequently compared to an optimal alcohol level; providing a fuel flow valve(s), wherein an adjustment signal is sent to the fuel flow valve(s) from the microprocessor, wherein the adjustment signal informs the fuel flow valve(s) how much additional fuel of the fuel stream to inject within the engine or how much fuel of the fuel stream to prevent from entering the engine in order to achieve the optimal alcohol level and then adjusting the amount of fuel injected within the engine via the fuel flow valve(s).

20 Claims, 3 Drawing Sheets

U.S. PATENT DOCUMENTS

| | | |
|---|---|---|
| 6,520,168 B2 | 2/2003 | Ishii et al. |
| 6,578,416 B1 | 6/2003 | Vogel et al. |
| 6,612,269 B2 | 9/2003 | Heffel et al. |
| 6,877,488 B2 | 4/2005 | Washeleski et al. |
| 7,055,505 B2 | 6/2006 | Washeleski et al. |
| 2002/0029770 A1 | 3/2002 | Heffel et al. |
| 2007/0089720 A1 | 4/2007 | Takahashi |

FOREIGN PATENT DOCUMENTS

| | | |
|---|---|---|
| GB | 2012356 A | 7/1979 |

* cited by examiner

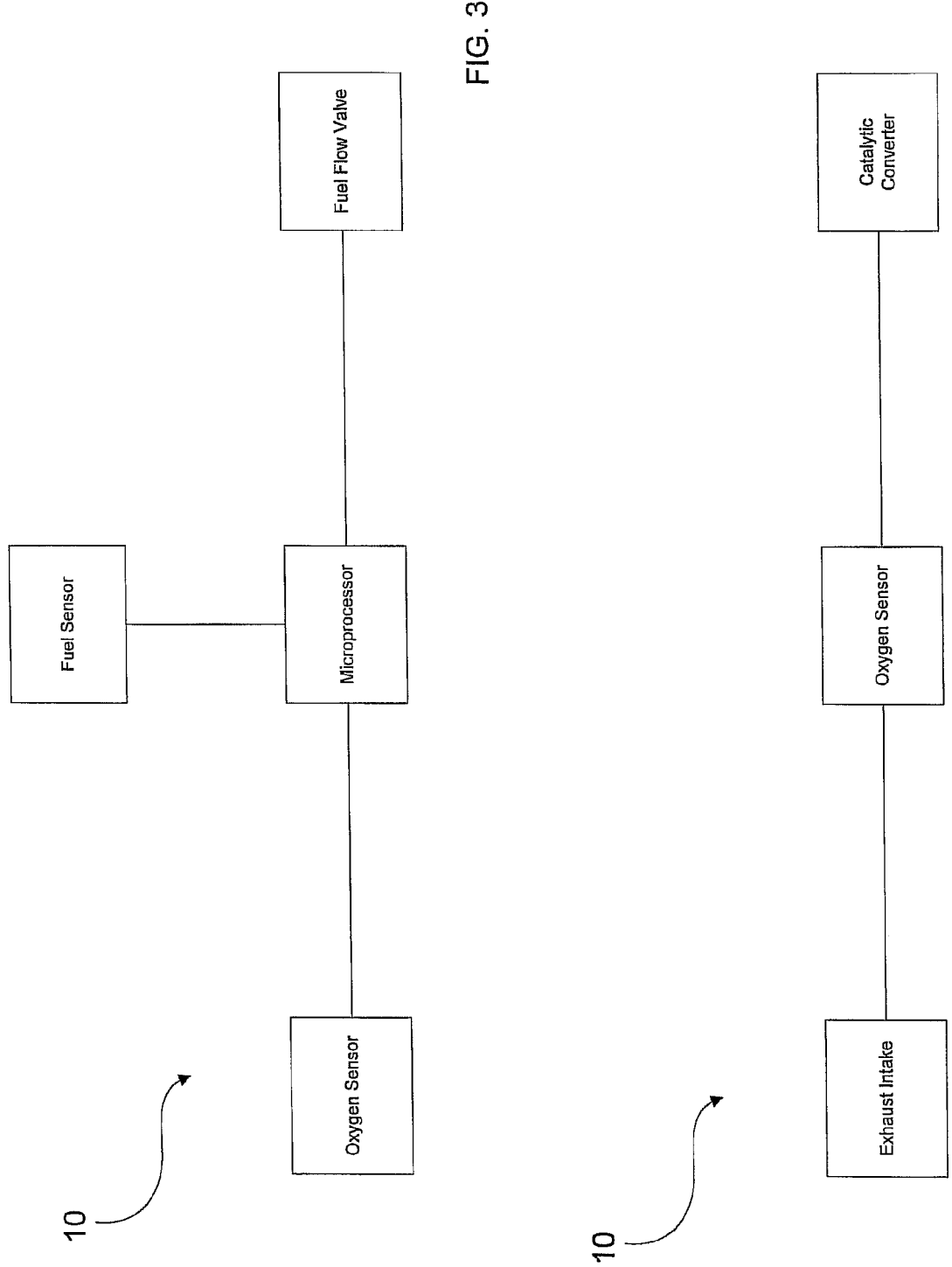

METHOD FOR OPERATING A FLEX FUEL CONVERSION SYSTEM

CROSS REFERENCE TO RELATED APPLICATIONS

I hereby claim benefit under Title 35, United States Code, Section 119(e) of U.S. provisional patent application Ser. No. 60/834,251 filed Jul. 28, 2006. The 60/834,251 application is currently pending. The 60/834,251 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to vehicles and more specifically it relates to a method for operating a flex fuel conversion system for efficiently providing an aftermarket fuel delivery system which allows a vehicle to be operated on gasoline, ethanol or any combination of gasoline and ethanol.

2. Description of the Related Art

Any discussion of the prior art throughout the specification should in no way be considered as an admission that such prior art is widely known or forms part of common general knowledge in the field.

Vehicles have been in use for years. Typically, most vehicles driven operate on some form of gasoline or ethanol. In recent years, ethanol has become more popular as an alternative fuel source and because of this vehicles manufactured in recent years are generally built to operate on gasoline, ethanol or a mixture thereof. However, older vehicles generally do not contain the proper equipment to allow the older vehicle to operate upon ethanol, thus forcing the driver to utilize standard gasoline.

Newer vehicles are manufactured to utilize gasoline, ethanol or a mixture thereof by positioning a sensor inline between the fuel tank and the fuel rail, thus measuring the current produced by the addition of ethanol into the fuel system. The signal by the sensor is then sent to the central fuel management computer module, wherein the computer module adjusts the amount of fuel (i.e. ethanol, gasoline) that is injected into the motor by altering the injector timing.

Due to federal emissions standards of preventing any individual from altering the factory installed fuel management system, aftermarket manufacturers have not been able to produce a flex fuel vehicle. Aftermarket manufacturers generally utilize an electronic module interfaced with the fuel management system, thus altering the factory settings and changing the injector opening cycle in order to inject more fuel within the cylinder.

Factory fuel injectors are generally not designed to operate for long periods at the intense level required by the changes of the aftermarket manufactures to the fuel system. In many instances, the vehicle "check engine" light may come on, due to the lean burn situation, thus often prompting the driver to fix their vehicle which can be expensive. Because of the general lack of efficiency and practicality in the prior art there is the need for a new and improved a method for operating a flex fuel conversion system for efficiently providing an aftermarket fuel delivery system which allows a vehicle to be operated on gasoline, ethanol or any combination of gasoline and ethanol.

BRIEF SUMMARY OF THE INVENTION

The general purpose of the present invention is to provide a method for operating a flex fuel conversion system that has many of the advantages of the vehicles mentioned heretofore. The invention generally relates to a flex fuel system which comprises providing a fuel sensor to measure a current alcohol level of fuel within a fuel stream of an engine; providing a microprocessor, wherein a first signal including the current alcohol level of the fuel is sent to the microprocessor from the fuel sensor and the current alcohol level is subsequently compared to an optimal alcohol level; providing a fuel flow valve(s) also commonly referred to as a fuel injector, wherein an adjustment signal is sent to the fuel flow valve(s) from the microprocessor, wherein the adjustment signal informs the fuel flow valve(s) how much additional fuel of the fuel stream to inject within the engine or how much fuel of the fuel stream to prevent from entering the engine in order to achieve the optimal alcohol level and then adjusting the amount of fuel injected within the engine via the fuel flow valve(s).

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a method for operating a flex fuel conversion system for efficiently providing an aftermarket fuel delivery system which allows a vehicle to be operated on gasoline, ethanol or any combination of gasoline and ethanol.

Another object is to provide a method for operating a flex fuel conversion system that may be adapted to various types of vehicles.

An additional object is to provide a method for operating a flex fuel conversion system that does not violate federal emissions standards.

An additional object is to provide a method for operating a flex fuel conversion system that allows the user the ability to manually adjust the fuel table for off-road and performance applications.

A further object is to provide a method for operating a flex fuel conversion system that includes a supplemental fuel system to provide additional fuel on demand.

Another object is to provide a method for operating a flex fuel conversion system that does not alter the factory programmed injector opening cycle.

Another object is to provide a method for operating a flex fuel conversion system that produces increased horsepower and torque when operating a vehicle on ethanol.

Another object is to provide a method for operating a flex fuel conversion system that reduces hydrocarbon, carbon monoxide and nitrogen oxide emissions.

Another object is to provide a method for operating a flex fuel conversion system that is easy to install.

Another object is to provide a method for operating a flex fuel conversion system that may be installed on any vehicle factory equipped with a port fuel injection system.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 3 is a flow diagram illustrating the electrical flow of oxygen sensor, fuel sensor, microprocessor and the fuel flow valve(s).

FIG. 4 is a flow diagram illustrating the placement of the oxygen sensor within the exhaust system of the engine.

DETAILED DESCRIPTION OF THE INVENTION

A. Overview

Figure 1:
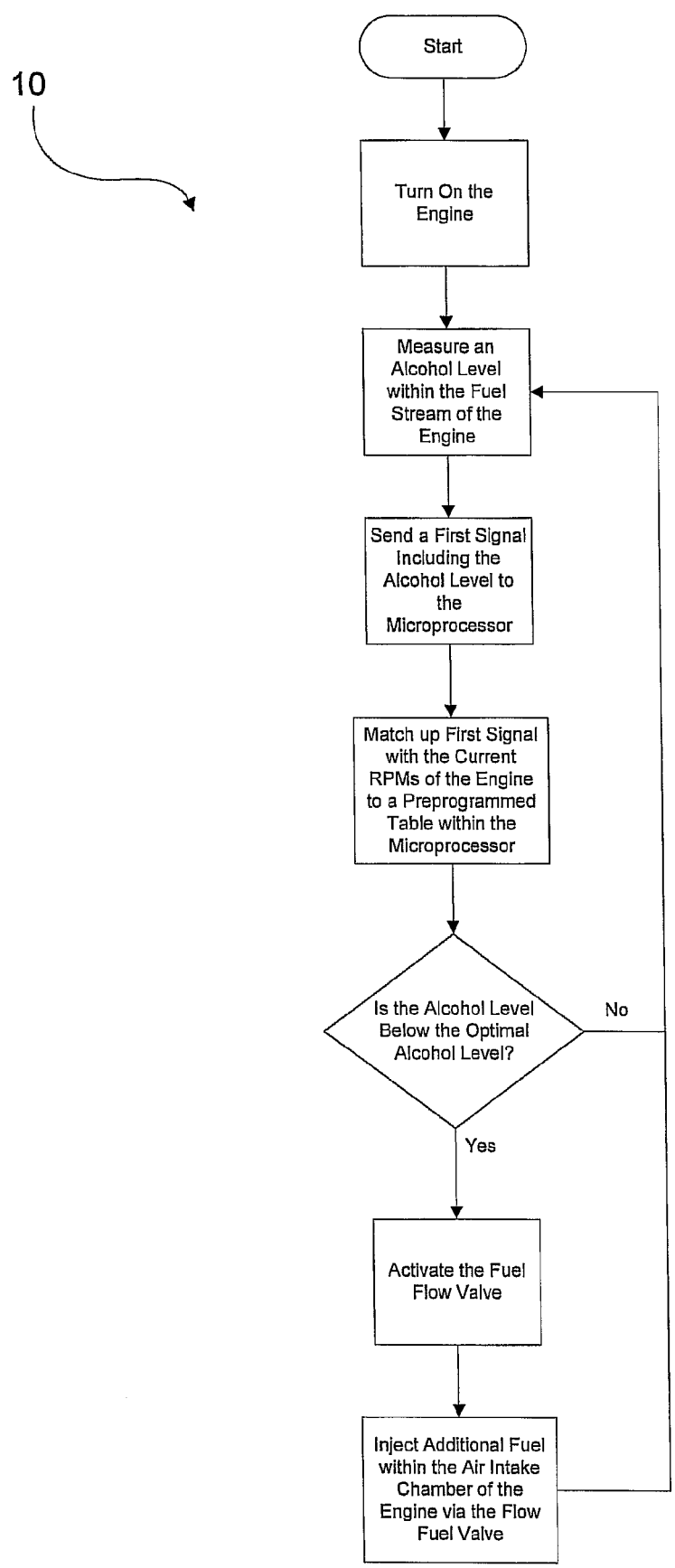
FIG. 1 is a flow chart illustrating the operation of the fuel sensor.
Figure 2:
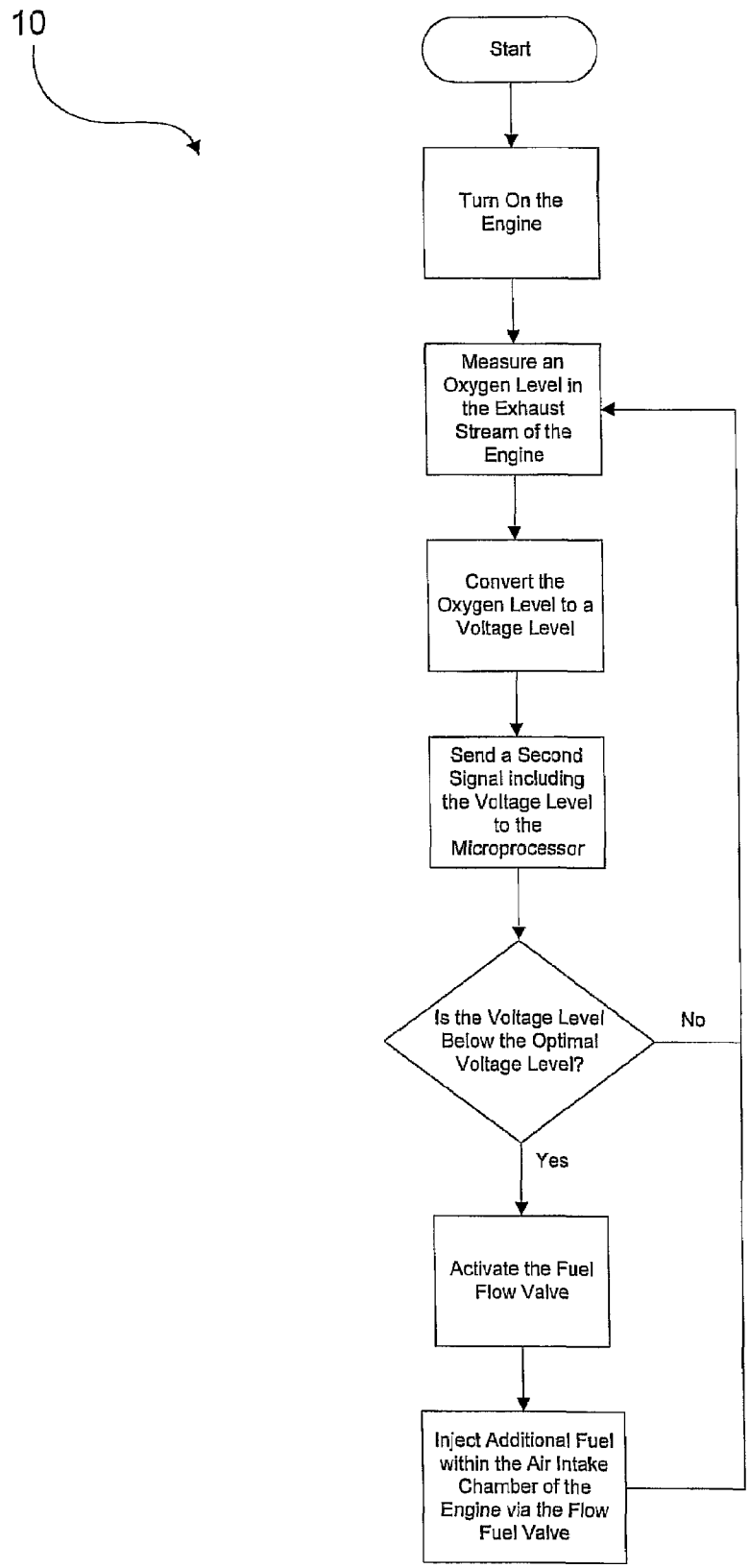
FIG. 2 is a flow chart illustrating the operation of the oxygen sensor.

Turning now descriptively to the drawings, in which similar reference characters denote similar elements throughout the several views, FIGS. 1 through 4 illustrate a method for operating a flex fuel conversion system 10, which comprises providing a fuel sensor to measure a current alcohol level of fuel within a fuel stream of an engine; providing a microprocessor, wherein a first signal including the current alcohol level of the fuel is sent to the microprocessor from the fuel sensor and the current alcohol level is subsequently compared to an optimal alcohol level; providing a fuel flow valve(s), wherein an adjustment signal is sent to the fuel flow valve(s) from the microprocessor, wherein the adjustment signal informs the fuel flow valve(s) how much additional fuel of the fuel stream to inject within the engine or how much fuel of the fuel stream to prevent from entering the engine in order to achieve the optimal alcohol level and then adjusting the amount of fuel injected within the engine via the fuel flow valve(s).

The engine utilized with the present invention may be comprised of various size engines utilized in various vehicles. The present invention may also be utilized with various types of other motors that are utilized for various purposes rather than with a vehicle.

B. Fuel Sensor

The present invention includes a fuel sensor to determine the amount of alcohol within the fuel. The fuel sensor is comprised of a flex fuel sensor, such as the FLEX FUEL SENSOR manufactured by SIEMENS VDO. The fuel sensor is preferably comprised of an auxiliary fuel sensor. The fuel sensor utilizes a dielectric sensor, wherein the dielectric sensor is able to accurately measure the alcohol content (i.e. ethanol) within the fuel. The fuel sensor is also positioned within the fuel line of the vehicle before the fuel rail (in a direction of travel of the fuel stream). The fuel sensor further preferably outputs a constant electrical signal to the microprocessor, wherein the fuel sensor outputs the first signal to the microprocessor many times per second to maintain the optimal alcohol/fuel ratio within the fuel stream.

The fuel sensor is electronically connected to the microprocessor, wherein the fuel sensor sends a respective first signal to the microprocessor corresponding with the amount of alcohol in the fuel. The fuel sensor sends the first signal to the microprocessor, wherein the first signal includes the current alcohol level within the fuel of the fuel line. A linear table is preprogrammed within the microprocessor to match up the signal received from the fuel sensor to an amount of fuel that needs to be injected within the fuel rail of the vehicle according to the current RPMs of the engine of the vehicle. The fuel sensor is also preferably electrically connected to the microprocessor in parallel to an oxygen sensor of the engine.

C. Oxygen Sensor

The present invention preferably utilizes a standard oxygen sensor of a vehicle mechanically connected to the vehicle's exhaust system. It is appreciated that the present invention may alternately include an auxiliary wide band oxygen sensor in place of or along with the fuel sensor to determine the amount of oxygen within the exhaust stream of the exhaust system. The exhaust system is mechanically connected to the engine and receives the exhaust from engine.

The exhaust system may include various parts common to exhaust systems, such as but not limited to catalytic converters, pipes and various other parts. The amount of oxygen within the exhaust stream is subsequently utilized to determine the current air/fuel ratio via a voltage level and how much fuel must be injected within the engine to achieve the optimal ratio. The oxygen sensor is positioned within the exhaust stream of the engine between the exhaust port of the cylinder head (i.e. exhaust intake) of the engine and the catalytic converter.

The oxygen sensor includes a zirconium dioxide element that when heated by the exhaust measures the amount of unburned oxygen within the exhaust stream of the exhaust system. A chemical reaction common to oxygen sensors subsequently converts the measured amount of unburned oxygen to a voltage level. It is appreciated that the present invention may utilize various types of oxygen sensors which operate in various manners rather than the described embodiment. The voltage reading by the oxygen sensor is then sent to the microprocessor and read by the microprocessor.

The oxygen sensor further operates within a direct current range of 0.1 to 1.0 volts. The optimal range of the air/fuel ratio within the engine and exhaust stream preferably correlates with an approximate 0.5 volt reading of the oxygen sensor. The oxygen sensor further preferably outputs a constant fluctuating electrical signal to the microprocessor, wherein the oxygen sensor outputs the voltage reading to the microprocessor many times per second to maintain the optimal air/fuel ratio within the engine.

The optimal air/fuel ratio is preferably 14.7/1 when utilizing a mixture of ethanol and gasoline as the primary source of fuel. The mixture of ethanol and gasoline utilized with the engine may be comprised of various mixtures of ethanol and gasoline, such as but not limited to E85 (85% ethanol and 15% gasoline) and various other mixtures. It is appreciated that if the proportion of ethanol becomes greater than the proportion of gasoline the engine's fuel requirements increase, wherein the engine requires more ethanol to achieve the same effects as a lesser amount of gasoline.

The addition of an auxiliary oxygen sensor is preferable for high performance and off-road use whereas the motor requires additional fuel when operating at higher engine speeds, and whereas the auxiliary oxygen sensor can provide additional fuel control of as much as 25% at wide open throttle.

In the preferred embodiment, the voltage level corresponding with a lean mixture of ethanol and gasoline within the engine corresponds with approximately 0.35 volts and below (i.e. lean voltage level). An optimal range of the air/fuel ratio corresponds with a voltage level in the range of approximately 0.35 to 0.65 volts (i.e. optimal voltage level). Subsequently, the voltage level corresponding with a rich mixture of ethanol and gasoline within the engine correspond with approximately 0.75 volts and above (i.e. rich voltage level). It is appreciated that the voltage levels may be adjusted according to various types of engines utilized and various levels of performance of the engine desired.

D. Microprocessor

The microprocessor is electrically connected between the fuel sensor and the fuel flow valve(s) and/or the oxygen sensor and the fuel flow valve(s), wherein the microprocessor receives independent signals from the fuel sensor and the oxygen sensor. The microprocessor processes the voltage reading sent from the fuel sensor and oxygen sensor to determine how much additional fuel is needed to be inputted within the engine by the fuel flow valve(s) to maintain or achieve the optimal air/fuel ratio and alcohol/fuel ratio. The microprocessor is also preferably comprised of an auxiliary microprocessor.

The microprocessor may also send a signal to the fuel flow valve(s) instructing the fuel flow valve(s) to reduce the amount of fuel being injected within the engine, wherein the alcohol level is too high. The microprocessor preferably processes information much faster (e.g. 100 times, etc.) than commonly installed factory microprocessors to ensure that the engine maintains an optimal air/fuel ratio and alcohol/fuel ratio.

The microprocessor also includes a first preprogrammed table within the microprocessor to be utilized in conjunction with the fuel sensor. The first preprogrammed table includes a plurality of optimal alcohol levels to match up with a corresponding desired RPM and of the engine and throttle position of the accelerator connected to the engine for that optimal alcohol level. When receiving the first signal from the fuel sensor, the microprocessor matches up the current RPMs of the engine and the current throttle position of the accelerator (e.g. physical position, etc.) with corresponding values upon the table and subsequently compares the current alcohol level contained within the first signal to the optimal alcohol level (value at the intersection of the current RPMs and the current throttle position upon the table).

If the current alcohol level does not substantially match the optimal alcohol level, the microprocessor sends a signal to the fuel flow valve(s) to inject fuel within the fuel rail or prevent fuel from being injected within the fuel rail according to the difference in the optimal alcohol level and the current alcohol level. The preprogrammed values of optimal alcohol levels and RPMs also preferably follow a linear path within the preprogrammed table.

The microprocessor also includes a second preprogrammed table within the microprocessor to be utilized in conjunction with the oxygen sensor. The second preprogrammed table includes a plurality of optimal air/fuel ratio values. The second preprogrammed table preferably supersedes the first preprogrammed table with respect to the microprocessor controlling the fuel flow valve(s). It is also appreciated that the values within the second preprogrammed tables may be modified via the user or various components of the present invention to accommodate various desired air/fuel ratios of the vehicle for various types of use, such as but not limited to off-road use, racing, highway driving or various others.

E. Fuel Flow Valve(s)

The fuel flow valve(s) is electrically connected to the microprocessor. The fuel flow valve(s) receives an electrical signal from the microprocessor, wherein the signal sent from the microprocessor selectively activates the fuel flow valve(s) according to the first signal received by the microprocessor from the fuel sensor or the second signal received by the microprocessor from the oxygen sensor. The fuel flow valve(s) preferably injects the fuel within the engine utilizing a standard electronic injection device common in the art. The fuel flow valve(s) is also preferably comprised of an auxiliary fuel flow vale(s) (i.e. injection valve).

The fuel flow valve(s) is activated for a predetermined period of time if the voltage level is categorized as lean (i.e. air/fuel ratio is less than optimal range). The fuel flow valve(s) is left deactivated if the voltage level read by the oxygen sensor is within the optimal range or within the rich range (i.e. air/fuel ratio is above the lean range).

The fuel flow valve(s) is preferably plumbed between the fuel line and the fuel rail of the engine. It is appreciated that the fuel rail is categorized as the apparatus that delivers the fuel to the preinstalled injectors of the engine. The outlet side of the fuel flow valve(s) is also plumbed into the air intake chamber or plenum chamber of the engine. The fuel flow valve(s) is further positioned downstream of the throttle plate of the engine. The air intake chamber may need to be drilled and tapped to accept an adapter sized to accept the output side of the fuel flow valve(s).

An auxiliary fuel line is attached to the input side of the fuel flow valve(s) and subsequently plumbed to the fuel system along the fuel rail (e.g. at factory test port of fuel rail, between fuel rail and fuel line, etc.). The auxiliary fuel line is preferably comprised of a flexible tubing structure. The auxiliary fuel line is also preferably attached to the fuel rail utilizing a T-shaped fitting. It is appreciated that the fuel flow valve(s) may attach to the fuel system in various manners rather than the described method.

When activated the fuel flow valve(s) injects additional fuel within the air intake chamber or plenum chamber of the engine to enrich the air/fuel ratio. When deactivated the fuel flow valve(s) prevents additional fuel from entering within the air intake chamber or plenum chamber. The amount of fuel injected within the air intake chamber and engine is preferably enough fuel to maintain the optimal air/fuel ratio needed by the particular engine. The amount of fuel needed may be calculated utilizing various methods, such as the difference between the optimal air/fuel ratio minus the current air/fuel ratio.

F. Operation of Preferred Embodiment

In use, after installing the present invention, the engine is first turned on. The fuel sensor subsequently measures an alcohol level of fuel (i.e. mixture of ethanol and gasoline) within the fuel stream of the fuel system and converts the alcohol reading to a voltage level. The voltage level (i.e. first signal) is subsequently sent to the microprocessor.

If the voltage level read by the microprocessor is categorized as lean the microprocessor subsequently electrically energizes the fuel flow valve(s). A first adjustment signal to inform the fuel flow valve(s) how much additional fuel needs to be injected within the engine or how much fuel needs to be prevented from entering the engine to obtain the optimal alcohol level within the engine is sent to the fuel flow valve(s) from the microprocessor. The fuel flow valve(s) injects a predetermined amount of fuel within the air intake chamber. The amount of fuel injected is an additional amount of fuel that would be needed to achieve the optimal alcohol/fuel ratio with respect to the current reading of the voltage level.

It is appreciated that the present invention is utilized to the present invention's full potential if a mixture of ethanol and gasoline is utilized as the fuel for the engine. The above process continually repeats while the engine is running.

While the engine is running, the oxygen sensor is also preferably operating and sending the second signal to the microprocessor independently of the fuel sensor and the first signal. The oxygen sensor subsequently measures an oxygen level within the exhaust stream of the exhaust system and converts the oxygen reading to a voltage level. The voltage level (i.e. second signal) is subsequently sent to the microprocessor.

If the voltage level read by the microprocessor is categorized as lean the microprocessor subsequently electrically energizes the fuel flow valve(s). A second adjustment signal to inform the fuel flow valve(s) how much additional fuel needs to be injected within the engine or how much fuel needs to be prevented from entering the engine to obtain the optimal voltage level (i.e. corresponding with the optimal oxygen level) within the exhaust system of the engine is sent to the fuel flow valve(s) from the microprocessor. The fuel flow valve(s) injects a predetermined amount of fuel within the air intake chamber. The amount of fuel injected is an additional amount of fuel that would be needed to achieve the optimal air/fuel ratio with respect to the current reading of the voltage level.

If the voltage level read by the microprocessor is in the optimal range or above the optimal range the fuel flow valve(s) is not activated. It is appreciated that the present invention is utilized to the present invention's full potential if a mixture of ethanol and gasoline is utilized as the fuel for the engine. It is also appreciated that if regular gasoline is solely utilized as the fuel for the engine, the oxygen sensor would normally sense the optimal air/fuel ratio and the fuel flow valve(s) would not be activated. The above process continually repeats while the engine is running.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A method for operating a flex fuel conversion system, comprising:
   providing a fuel sensor;
   measuring a current alcohol level of fuel within a fuel stream of an engine with said fuel sensor;
   providing a microprocessor;
   sending a first signal including said current alcohol level of said fuel stream to said microprocessor from said fuel sensor;
   determining if said current alcohol level matches up with a predetermined optimal alcohol level;
   providing a fuel flow valve(s);
   sending an adjustment signal to said fuel flow valve(s) from said microprocessor, wherein said adjustment signal informs said fuel flow valve(s) how much additional fuel of said fuel stream to inject within said engine or how much fuel of said fuel stream to prevent from entering said engine; and
   adjusting said amount of fuel injected within said engine via said fuel flow valve(s).

2. The method for operating a flex fuel conversion system of claim 1, wherein said adjustment signal is sent to said fuel flow valve(s) from said microprocessor if said current alcohol level differs from said optimal alcohol level.

3. The method for operating a flex fuel conversion system of claim 1, wherein said fuel sensor is comprised of a flex fuel sensor.

4. The method for operating a flex fuel conversion system of claim 1, wherein said microprocessor energizes said fuel flow valve(s).

5. The method for operating a flex fuel conversion system of claim 1, wherein said microprocessor includes a preprogrammed table, wherein said preprogrammed table includes a plurality of optimal alcohol levels to match up with a plurality of corresponding RPMs of said engine and a plurality of throttle position values of an accelerator pedal of said engine.

6. The method for operating a flex fuel conversion system of claim 5, wherein said plurality of optimal alcohol levels and said plurality of corresponding RPMs of said engine have a linear relationship.

7. The method for operating a flex fuel conversion system of claim 5, wherein a respective said current alcohol level is compared to a respective said optimal alcohol level of said plurality of optimal alcohol levels according to a current RPM of said engine and a current throttle position value of an accelerator pedal connected to said engine matched up with a corresponding RPM of said plurality of corresponding RPMs and a corresponding accelerator position value of said plurality of throttle position values.

8. The method for operating a flex fuel conversion system of claim 1, including an oxygen sensor positioned within an exhaust system of said engine, wherein said oxygen sensor is electrically connected to said microprocessor.

9. The method for operating a flex fuel conversion system of claim 8, wherein said oxygen sensor and said fuel sensor are connected in parallel to said microprocessor.

10. The method for operating a flex fuel conversion system of claim 8, wherein said oxygen sensor measures an oxygen level within an exhaust stream of said exhaust system.

11. The method for operating a flex fuel conversion system of claim 10, including a step of electrically sending a voltage level of said oxygen sensor to said microprocessor.

12. The method for operating a flex fuel conversion system of claim 1, wherein said fuel flow valve(s) is positioned within an air intake chamber of said engine.

13. The method for operating a flex fuel conversion system of claim 12, wherein an output port of said fuel flow valve(s) is fluidly connected within said air intake chamber and wherein an input port of said fuel flow valve(s) is fluidly connected to said fuel stream.

14. The method for operating a flex fuel conversion system of claim 1, wherein said fuel flow valve(s) is comprised of an electronic injection device.

15. The method for operating a flex fuel conversion system of claim 1, including a step of deactivating said fuel flow valve(s) after said step of adjusting said amount of fuel injected.

16. A method for operating a flex fuel conversion system, comprising:
provided a fuel sensor;
measuring a current alcohol level of fuel within a fuel stream of an engine with said fuel sensor;
providing a microprocessor;
sending a first signal including said current alcohol level of said fuel stream to said microprocessor from said fuel sensor;
determining if said current alcohol level matches up with a predetermined optimal alcohol level;
providing a fuel flow valve(s);
sending a first adjustment signal to said fuel flow valve(s) from said microprocessor, wherein said first adjustment signal informs said fuel flow valve(s) how much additional fuel of said fuel stream to inject within said engine or how much fuel of said fuel stream to prevent from entering said engine;
adjusting said amount of fuel injected within said engine via said fuel flow valve(s);
providing an oxygen sensor positioned within an exhaust stream of an exhaust system of said engine;
measuring a current oxygen level within said exhaust stream of said exhaust system;
sending a second signal including said current oxygen level to said microprocessor from said oxygen sensor;
determining if said current oxygen level matches up with a predetermined optimal oxygen level;
sending a second adjustment signal to said fuel flow valve(s) from said microprocessor, wherein said second adjustment signal informs said fuel flow valve(s) how much additional fuel of said fuel stream to inject within said engine or how much fuel of said fuel stream to prevent from entering said engine; and
adjusting said amount of fuel injected within said engine via said fuel flow valve(s).

17. The method for operating a flex fuel conversion system of claim 16, wherein said fuel sensor is comprised of a flex fuel sensor.

18. The method for operating a flex fuel conversion system of claim 16, wherein said fuel flow valve(s) is comprised of an electronic injection device.

19. The method for operating a flex fuel conversion system of claim 16, including a step of deactivating said fuel flow valve(s) after said step of adjusting said amount of fuel injected.

20. A method for operating a flex fuel conversion system, comprising:
providing an auxiliary flex fuel sensor;
measuring a current alcohol level of fuel within a fuel stream of an engine with said flex fuel sensor;
providing an auxiliary microprocessor;
sending a first signal including said current alcohol level of said fuel stream to said microprocessor from said flex fuel sensor;
determining if said current alcohol level matches up with a predetermined optimal alcohol level of a preprogrammed table within said microprocessor, wherein said preprogrammed table includes a plurality of optimal alcohol levels to match up with a plurality of corresponding RPMs of said engine and a plurality of throttle position values of an accelerator pedal of said engine;
comparing a current alcohol level to a respective said optimal alcohol level of said plurality of optimal alcohol levels according to a current RPM of said engine and a current throttle position value of an accelerator pedal connected to said engine matched up with a corresponding RPM of said plurality of corresponding RPMs and a corresponding accelerator position value of said plurality of throttle position values;
providing an auxiliary fuel flow valve(s) positioned within an air intake chamber of said engine, wherein an output port of said fuel flow valve(s) is fluidly connected within said air intake chamber and wherein an input port of said fuel flow valve(s) is fluidly connected to said fuel stream and wherein said fuel flow valve(s) is comprised of an electronic injection device;
energizing said fuel flow valve(s) via said microprocessor;
sending an adjustment signal to said fuel flow valve(s) from said microprocessor if said current alcohol level differs from said optimal alcohol level, wherein said adjustment signal informs said fuel flow valve(s) how much additional fuel of said fuel stream to inject within said engine or how much fuel of said fuel stream to prevent from entering said engine;
adjusting said amount of fuel injected within said engine via said fuel flow valve(s); and
deactivating said fuel flow valve(s) after said step of adjusting said amount of fuel injected.

* * * * *